Aug. 5, 1930.                    M. FIRL                    1,772,392
                 HOLDER FOR BUCKETS AND OTHER CONTAINERS
                          Filed Aug. 30, 1928
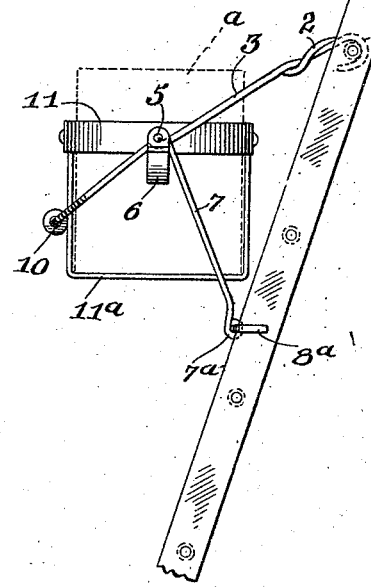
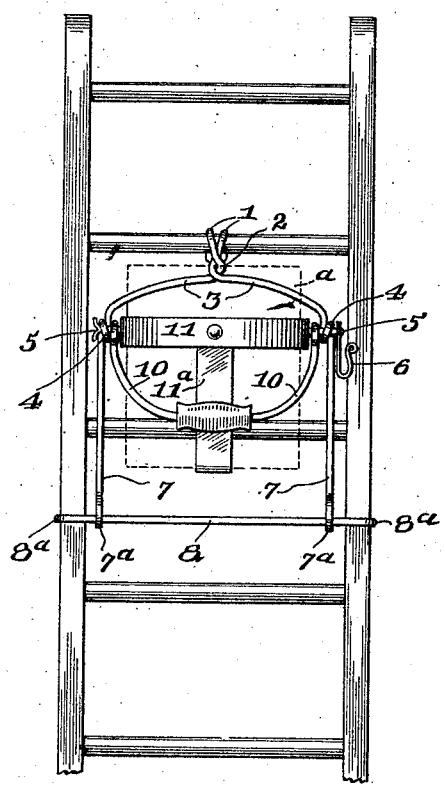
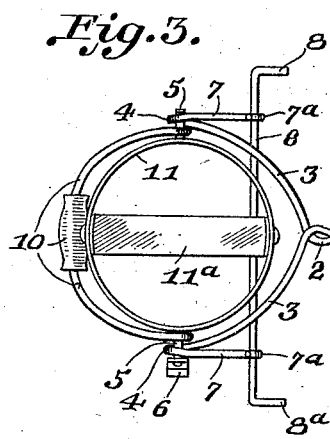
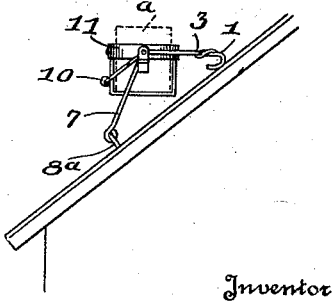
Inventor
Milton Firl
By
Hubert E. Peck, Attorney Patented Aug. 5, 1930

1,772,392

UNITED STATES PATENT OFFICE

MILTON FIRL, OF MEYERSDALE, PENNSYLVANIA

HOLDER FOR BUCKETS AND OTHER CONTAINERS

Application filed August 30, 1928. Serial No. 302,987.

This invention provides a comparatively simple, durable, and easily handled holder for paint and other buckets, fruit and other containers, whereby such buckets and other containers can be supported in convenient upright position on the ground, ladders, fences, roofs, trees or elsewhere, and the objects and nature of the invention will be understood by those skilled in the art in the light of the following explanations of the accompanying drawings that illustrate what I now believe to be the preferred mechanical expression or embodiment of my invention from among other forms, constructions and arrangements within the spirit and scope thereof.

An object of the invention is to provide an improved holder or carrier for containers, whereby such containers will automatically assume and maintain their normal upright position and can be thus manually transported and held, and whereby the containers can be thus supported, with their open tops accessible and unobstructed from ladders, fences, trees, etc., and on roofs, the ground and elsewhere.

With the foregoing and other objects in view, my invention consists in certain novel features of construction and combination and arrangements or formations as more fully and particularly described and specified hereinafter.

Referring to the accompanying drawings, forming a part hereof:—

Fig. 1 is a side elevation showing an embodiment of the holder of my invention supporting a container, shown by dotted lines, on or from a ladder.

Fig. 2 is a front elevation of the matter disclosed by Fig. 1.

Fig. 3 is a detached top plan of the holder of Fig. 1.

Fig. 4 is an elevation of the holder applied to a diagrammatically illustrated fence.

Fig. 5 diagrammatically illustrates part of a roof with the holder of Fig. 1 arranged thereon and supporting a container shown by dotted lines.

The container carrier or support of my invention, embodies a strong preferably stiff or rigid frame having opposite longitudinal sides or side bars 3, 7, each of which diverges from an elevated elbow or apex, at which elbow or apex is located an eye 4, providing a transverse bearing, in this instance a bearing opening, these two transverse eyes 4, being longitudinally alined. The diverging lengths 3, 7, of each side of the frame are in one piece or rigid with each other and are, preferably, of approximately equal lengths, although I do not, in all respects, wish to so limit my invention. The two similar parallel side bar lengths 3, form one supporting end of the frame and can form one or more legs to rest on the ground or other support or to catch over or hook on to an elevated support, as a ladder rung, a tree limb, a fence rail, etc.

In the specific example illustrated, the lengths 3, laterally converge to form a yoke terminating at its outer end in a longitudinally projecting central hook 1, to catch over a ladder rung or other elevated support for supporting and suspending the entire organization therefrom, or to form the central supporting foot of the frame leg or end 3, 3, when the organization is resting on a level or inclined support, as shown by Fig. 5. In the example shown, the hook 1, is joined to the converging bar lengths 3, 3, by a strong stiff twisted length 2, forming the longitudinally projecting shank 2, of the hook 1. The other end of the supporting frame that embodies the parallel legs 7, that diverge with respect to frame end 3, 3, is provided with a stiff strong transverse or end cross bar 8, rigid with and connecting the outer extremities of side bar lengths 3, and preferably projecting laterally therefrom and at its opposite ends terminating in parallel lateral feet or projections 8ª.

This cross end 8, constitutes a base or foot to traverse and bear on the top edges of the uprights of a ladder (Figs. 1 and 2) a distance below the rung over which the suspending hook 1, is engaged. When the carrier is supported on the ground or on a roof, the feet 8ª, and the hook rest on the supporting surface, and constitute a three point support for the entire organization, and in fact this is also true when the organization is supported on a ladder as in Figs. 1 and 2.

An open-top cup-like support 11, 11ª, for any suitable bucket or other open-top container, is loosely or pivotally and centrally hung or suspended in an elevated position within the angular supporting jack or frame 1, 2, 3, 7, 8. For instance, this container receptacle or cup 11, 11ª, is arranged centrally between the opposite frame sides 3, 7, and at its upper end is provided with alined outwardly projecting diametrically opposite strong supporting pintles 5, rotatably confined in the frame eyes or bearings 4. The pivotal axis 5, 5, thus formed is located above the center of gravity of the freely-swingable container receptacle 11, 11ª, so that said receptacle with or without the removable container a, always maintains and tends to maintain its normal upright position by gravity.

The paint or other bucket or fruit or other container a, can be dropped into and lifted from the receptacle 11, 11ª, through the top ring 11, thereof, and rests on and is supported by the bottom 11ª, and is removably retained by the receptacle in upright position preferably rising above the level of top ring 11.

The bucket or container a, is thus held in a convenient position with its open top freely accessible and unobstructed, by any parts of the supporting jack or frame.

The supporting frame and the container carried thereby, can be supported as a unit through the medium of any suitable handle, such as swingable bail 10, confined loosely to pintles 5. This handle is free to drop down out of the way, to its normal position, as shown by Figs. 1, 2 and 3. When the entire organization is transported by handle 10, the receptacle 11, 11ª, and the container therein automatically assume and maintain upright vertical position by gravity, and this fact remains true when the holder assumes the various positions appearing in the drawings.

If so desired, a paint brush holding hook or clamp 6, can be hung on one of the pintles 5 in a convenient accessible position.

It will be noted, that the supporting frame or jack, in elevation, is in the form of an open loop or yoke, while in side or edge elevation it is triangular or approximately V-shape in form.

If so desired, this frame can be composed of a single stiff metal rod doubled, bent, twisted and curled to produce the form shown, with the rod 8, 8ª, added and secured thereto, although I do not wish to so limit my invention.

It is evident that various changes and modifications can be resorted to without departing from the spirit and scope of my invention and hence I do not wish to limit myself to the approximately exact disclosure hereof, which disclosure I wish to construe as illustrative and not as strictly limiting.

What I claim is:

1. A container carrier, including a supporting frame having diverging ends terminating in supporting feet, at least one of which is formed to grasp an elevated support and to suspend the carrier therefrom; and a swingable container holding receptacle open at the top to receive and uphold a container dropped thereinto from above and removable upwardly therefrom, said container retaining receptacle being pivotally supported on a horizontal axis from an elevated intermediate portion of said frame, and arranged to automatically maintain the container therein in upright position by gravity with the open top of the container accessible and unobstructed from above.

2. A container carrier, including a rigid supporting frame diverging longitudinally and downwardly from an intermediate elevated portion, and at its opposite ends providing supporting feet, at least one of which constitutes a suspending hook; and a vertically swingable container receiving and upholding receptacle open at its top and pivotally mounted above its center of gravity in said elevated portion remote from and midway between said end feet and free to maintain its upright position by gravity.

3. A container carrier having a supporting frame embodying fixed longitudinal spaced frame sides converging downwardly and longitudinally from elevated elbow portions, said frame having end feet and a suspending hook; and a freely swingable container receiving and upholding receptacle open at its upper end and hung from said elevated elbow portions and arranged between said frame sides.

4. A container carrier including a rigid supporting frame at one end providing a central longitudinal suspending hook and at the other end a transversely arranged spaced pair of supporting feet relatively fixed with respect to said hook; and an open top retaining receptacle for an upright container hung from and suspended in said frame to freely swing by gravity in maintaining upright position, the axis on which said holder is hung being elevated and approximately midway between the ends of said frame whereby the upper end of the container is freely accessible.

5. A container carrier including a rigid supporting frame at one end having fixed spaced supporting feet and a fixed tranverse bar, the opposite end of the frame providing a fixed suspending hook that also forms a supporting foot; and means carried by said frame for supporting an upright container and maintaining the same in accessible vertical position, said means being mounted at a point intermediate the length of the frame and elevated with regard to said hook and said feet.

6. A container carrier including a supporting frame intermediate its length having a retaining receptacle for an upright container suspended to swing vertically on a transverse axis to automatically maintain the container in vertical position by gravity with its open upper end unobstructed from above; one end of said frame providing means for suspending the carrier from a ladder rung, and the opposite end of said frame providing relatively fixed spaced supporting feet to rest on a lower portion of the ladder, said means and said feet constituting fixed portions of said frame.

7. A container carrier, of the type substantially set forth, including a supporting frame having relatively fixed opposite sides spaced apart providing intermediate their lengths corresponding opposite elevated portions, said frame having opposite end supporting feet depressed with respect to said elevated portions, the foot at one end of the frame adapted to suspend the carrier from an elevated support and the foot at the other end of the frame adapted to engage such support at a lower point; and a vertically swingable retaining receptacle to bodily receive and retain a container arranged between said elevated portions of the sides and pivotally supported therefrom between said fixed sides approximately midway between the depressed end feet, to freely maintain its upright position by gravity, said receptacle adapted to removably receive and uphold a container with its upper end freely accessible and unobstructed by the frame and receptacle from above.

8. A carrier for open top buckets and other containers, embodying a stiff supporting frame approximately V-shaped in side elevation and having supporting feet at its opposite ends spaced a fixed distance apart longitudinally of the frame, one end of the frame as a fixed part thereof forming a central longitudinal hook constituting one of said supporting feet, the opposite end of the frame as fixed parts thereof forming a cross member and supporting feet spaced a fixed distance apart, said frames including relatively fixed longitudinal sides at one end of the frame fixedly connected by said hook and at the opposite end of the frame spaced apart and fixedly connected by said cross member, the relatively elevated intermediate portions of said sides being spaced apart, and a container receiving and retaining receptacle arranged between said intermediate portions of the sides and hung therefrom to freely swing vertically on a transverse axis, said receptacle adapted to removably receive the body of a container and uphold the same with its open upper end accessible and unobstructed from above.

9. A portable carrier for removably receiving an open top container and retaining the same in freely swingable upright position with its open top accessible and unobstructed from above by any part of the carrier or by the container handle; said carrier embodying a supporting frame at its opposite ends having supporting feet constituting fixed parts of the frame, said feet providing a hook at one end of the frame and a fixed cross member at the opposite end of the frame, the intermediate portion of the frame being elevated with respect to said opposite end feet and embodying frame sides spaced a fixed distance apart, and a container receiving and holding receptacle embodying a ring and depending container supports arranged between said frame sides and hung therefrom to freely swing vertically on a transverse axis.

Signed at Meyersdale, Pennsylvania, this 28th day of August, 1928.

MILTON FIRL.